US012441411B2

(12) United States Patent
Athmani et al.

(10) Patent No.: US 12,441,411 B2
(45) Date of Patent: Oct. 14, 2025

(54) BODY STRUCTURE FOR A MOTOR VEHICLE

(71) Applicant: Bayerische Motoren Werke Aktiengesellschaft, Munich (DE)

(72) Inventors: Riad Athmani, Munich (DE); Alexander Boeck, Munich (DE); Michael Hainzinger, Volkenschwand (DE); Johannes Hasselbach, Kissing (DE); Nermin Kecalevic, Markt Schwaben (DE); Juergen Leschhorn, Geltendorf (DE); Jyrki Majamaeki, Dorfen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 368 days.

(21) Appl. No.: 18/019,106

(22) PCT Filed: Jul. 2, 2021

(86) PCT No.: PCT/EP2021/068367
§ 371 (c)(1),
(2) Date: Feb. 1, 2023

(87) PCT Pub. No.: WO2022/033768
PCT Pub. Date: Feb. 17, 2022

(65) Prior Publication Data
US 2023/0312018 A1    Oct. 5, 2023

(30) Foreign Application Priority Data
Aug. 11, 2020    (DE) .................... 10 2020 121 094.9

(51) Int. Cl.
*B62D 25/02*    (2006.01)
*B62D 21/15*    (2006.01)
(Continued)

(52) U.S. Cl.
CPC .......... *B62D 25/2036* (2013.01); *B62D 21/15* (2013.01); *B62D 25/025* (2013.01); *B62D 25/2018* (2013.01); *B62D 27/023* (2013.01)

(58) Field of Classification Search
CPC .............. B62D 25/2036; B62D 25/025; B62D 25/2018; B62D 25/2045; B62D 21/15; B62D 21/157; B62D 27/023
(Continued)

(56) References Cited

U.S. PATENT DOCUMENTS

| 5,882,065 A | 3/1999 | Koiwa et al. |
| 8,382,195 B2 * | 2/2013 | Iwase .................. B62D 25/025 |
| | | 296/193.06 |

(Continued)

FOREIGN PATENT DOCUMENTS

| CN | 101500881 A | 8/2009 |
| DE | 10 2007 017 165 A1 | 10/2008 |

(Continued)

OTHER PUBLICATIONS

English translation of Chinese-language Office Action issued in Chinese Application No. 202180056529.3 dated Aug. 30, 2024 (7 pages).

(Continued)

*Primary Examiner* — Dennis H Pedder
(74) *Attorney, Agent, or Firm* — Crowell & Moring LLP

(57) ABSTRACT

A body structure for a motor vehicle includes two inner sills having an undulating cross section, a floor panel arranged in the transverse direction of the vehicle between the inner sills, and two funnel-shaped force-introducing elements which are connected in respective front sill regions to the inner sills and widen in a funnel-shaped manner transversely with respect to the longitudinal direction of the vehicle and, behind respective front wheelhouse regions, are supported
(Continued)

on the rear side by their respective widened end region on a bulkhead of the body structure. A motor vehicle includes a body structure of this kind.

9 Claims, 4 Drawing Sheets

(51) Int. Cl.
 *B62D 25/20* (2006.01)
 *B62D 27/02* (2006.01)
(58) Field of Classification Search
 USPC ........... 296/209, 187.09, 187.1, 198, 193.02, 296/203.01, 203.02, 193.05, 29, 30
 See application file for complete search history.

(56) References Cited

U.S. PATENT DOCUMENTS

| | | |
|---|---|---|
| 9,045,175 B2 | 6/2015 | Mori |
| 2009/0243343 A1 | 10/2009 | Tamakoshi |
| 2011/0119542 A1 | 5/2011 | Siebert et al. |
| 2013/0140854 A1 | 6/2013 | Mori |
| 2013/0161981 A1 | 6/2013 | Mildner |
| 2015/0145284 A1 | 5/2015 | Nishida et al. |
| 2015/0166112 A1 | 6/2015 | Chung |
| 2018/0065686 A1 | 3/2018 | Maier |
| 2019/0256147 A1* | 8/2019 | Saje ..................... B62D 25/082 |
| 2020/0108871 A1* | 4/2020 | Sakurai ................ B62D 25/025 |

FOREIGN PATENT DOCUMENTS

| | | |
|---|---|---|
| DE | 10 2010 051 271 A1 | 5/2012 |
| DE | 10 2011 103 762 A1 | 12/2012 |
| DE | 10 2011 121 908 A1 | 6/2013 |
| DE | 10 2012 020 865 A1 | 4/2014 |
| DE | 10 2018 212 817 A1 | 2/2020 |
| EP | 0 908 371 A2 | 4/1999 |
| EP | 3 293 078 A1 | 3/2018 |
| WO | WO 2012/026028 A1 | 3/2012 |
| WO | WO 2016/146694 A1 | 9/2016 |

OTHER PUBLICATIONS

International Search Report (PCT/ISA/210) issued in PCT Application No. PCT/EP2021/068367 dated Oct. 4, 2021 with English translation (four (4) pages).

* cited by examiner

BODY STRUCTURE FOR A MOTOR VEHICLE

BACKGROUND AND SUMMARY

The present invention relates to a body structure for a motor vehicle, and to a motor vehicle having a body structure of this type.

In frontal crash load events of electrified vehicles, not only the customary structural ratings but also deformations of high-voltage components which are to be protected are relevant. This alone already sets higher requirements in terms of a front structure, or body structure in the front region, of a motor vehicle, respectively. Moreover, the so-called structure node in the region of the bulkhead, A-pillar and rocker panels has become enormously more important in terms of the frontal crash because longitudinal load paths which are often required for absorption above all in frontal crash load events, owing to installation spaces that have to be provided for high-voltage components, are no longer present, or present only to a minor extent, in comparison to conventional motor vehicles driven by internal combustion engines.

DE 10 2007 017 165 A1 shows a door sill of a motor vehicle that extends in the vehicle longitudinal direction. The door sill comprises an inner side panel that faces a passenger cabin, and an outer side panel that forms part of an outer skin of the motor vehicle. Between the side panels, the door sill has a reinforcement panel which serves for strengthening. The reinforcement panel, in a central region disposed between the upper and the lower delimitation thereof, has a U-shaped deformation having two legs and a base, the latter being fastened to the inner side panel by means of an adhesive fastening. The reinforcement panel at the top and the bottom has respective flanges for welding to the side panels.

DE 10 2018 212 817 A1 shows a rocker panel reinforcement of a motor vehicle, which on the vehicle floor extends laterally, in the vehicle longitudinal direction, between the front wheels and the rear wheels. The rocker panel reinforcement is composed of a hollow section composite which has two sub-profiles which are configured so as to be undulating in the vehicle transverse direction and, like two clamshells, are joined together with the wave crests thereof facing each other, a continuous partition wall being disposed therebetween.

DE 10 2011 121 908 A1 shows a side sill of a motor vehicle having an L-shaped side sill reinforcement.

US 2015/0166112 A1 shows a reinforcement structure for a vehicle body. The reinforcement structure has a side sill and reinforcement elements which extend in different directions of the vehicle.

US 2013/0140854 A1 shows a longitudinal chassis beam structure for a motor vehicle, which has an inner side sill and an outer side sill, the side sills each having an undulating cross section and being disposed on one another.

WO 2016/146694 A1 shows a side sill of a motor vehicle, which, when viewed in the vehicle transverse direction, has an inner panel and an outer panel which therebetween enclose two cavities disposed on top of one another. The panels have in each case an undulating cross section.

It is the object of the present invention to provide a body structure which has a particularly high stability in frontal crash load events.

This object is achieved by a body structure for a motor vehicle in accordance with the independent claim. Further potential design embodiments of the invention are set forth in the dependent claims, the description and the figures.

The body structure according to the invention for a motor vehicle comprises two inner sills having an undulating cross section, and a floor panel which in the vehicle transverse direction is disposed between the inner sills. The body structure furthermore has two funnel-shaped force introduction elements which, in respective front sill regions, are connected to the inner sills and, in a funnel-shaped manner, widen transversely to the vehicle longitudinal direction, and behind respective front wheelhouse regions, by way of the respective widened end region of the force introduction elements, are supported on the rear side on a bulkhead of the body structure. The bulkhead is in particular provided between a front end and a passenger cabin, the bulkhead mutually separating the passenger cabin and the front end below a windshield. The bulkhead serves inter alia for increasing the stiffness of the body.

Additional longitudinal load paths having a plurality of load-bearing edges are provided by the inner sills having the undulating cross section, the load-bearing edges moreover enabling support toward the front up to the bulkhead of the body structure. Respective longitudinal edges of the inner sills run in particular in a straight line and can extend parallel to the vehicle longitudinal direction. The funnel-shaped force introduction elements which in the respective front sill regions are connected to the inner sills thus widen toward the front. As a result, a particularly wide range of scatter in terms of wheel impact points toward the front can be covered in the event of a crash.

The widened end regions of the funnel-shaped force introduction elements, which are disposed behind the respective front wheelhouse regions, in the event of a crash can ensure, in particular also in the case of dissimilar wheel sizes, that forces are absorbed and transmitted in particular to the inner sills with their undulating cross section. The invention is based inter alia on the concept that dissimilar wheel sizes or rim sizes, respectively, in the event of a crash can impact different points of the front wheelhouse regions. As a result of the funnel-shaped force introduction elements being flared toward the front, thus in the direction of the front wheelhouse regions and the bulkhead, in the event of a crash a particularly wide or large range of scatter, respectively, in terms of wheel impact points can therefore be covered.

By means of the body structure according to the invention it is in particular possible for a particularly high level of support of the A-pillar and the bulkhead to be ensured in frontal crash load events. The body structure can in particular be provided for electrically driven motor vehicles in which a high-voltage battery can be disposed behind the bulkhead and in the region of the floor panel, for example. However, the body structure can likewise be used in motor vehicles which are driven solely by an internal combustion engine, for example.

One potential design embodiment provides that the inner sills have a w-shaped cross section. As a result, the inner sills have many edges which run in particular in a rectilinear manner and which can serve for absorbing crash loads in the vehicle longitudinal direction. These edges can in particular run parallel to the vehicle longitudinal direction. The inner sills with their w-shaped cross section can thus particularly well provide additional longitudinal load paths having a plurality of load-bearing edges, and enable support toward the front up to the bulkhead of the body structure.

A further potential design embodiment of the invention provides that the funnel-shaped force introduction elements widen in the vehicle transverse direction and/or in the vehicle vertical direction. In the case of most dissimilar rim sizes, or wheel sizes, respectively, the funnel-shaped force introduction elements can thus ensure that corresponding crash loads can be absorbed and transmitted to the two inner sills, even in the case of most dissimilar impact points of respective rims or wheels. In this way it is possible to ensure a reliable transmission of force to the two inner sills with their undulating cross sections in the case of most dissimilar rim widths, rim diameters and correspondingly dissimilar tire widths and tire diameters.

In a further potential design embodiment of the invention it is provided that the body structure has two outer sills which in the vehicle transverse direction are disposed on the external side on the inner sills. The inner sills and the outer sills offer correspondingly many longitudinal load paths which can ensure, in particular in the event of a frontal crash, that above all the motor vehicle is particularly well protected in the region behind the bulkhead.

According to a further potential design embodiment of the invention it is provided that the body structure has a continuous cross member which in the vehicle longitudinal direction behind the bulkhead is disposed on the latter. The cross member can in particular at least substantially extend across the entire width of the body structure in the vehicle transverse direction, and is configured so as to be continuous, i.e. without interruptions. A particularly stable body structure can be provided as a result.

A further potential design embodiment of the invention provides that respective cross member longitudinal ends of the cross member in the vehicle longitudinal direction are disposed behind the front wheelhouse regions, and these respective cross member longitudinal ends are welded so as to overlap on the bulkhead. The cross member longitudinal ends of the continuous cross member thus overlap the respective front wheelhouse regions on the rear side. As a result of the longitudinal chassis beam ends being welded to the bulkhead and overlapping the wheelhouse regions, a particularly stable body structure can be provided.

In a further potential design embodiment of the invention it is provided that the cross member is disposed above the funnel-shaped force introduction elements. For example, the funnel-shaped force introduction elements by way of the widened end regions thereof can bear on correspondingly conceived attachment points of the cross member, and be welded to the latter, for example. The widened end regions of the funnel-shaped force introduction elements can thus at least partially also be supported below the cross member and be at least partially, or in regions, supported on the latter, respectively, this yet again contributing toward improving the crash characteristics of the body structure.

In a further potential design embodiment of the invention it is provided that the cross member in the vehicle longitudinal direction is disposed in front of respective A-pillars. A particularly good support of the A-pillar and of the bulkhead can be ensured in particular in frontal crash load events as a result.

A further potential design embodiment of the invention provides that the funnel-shaped force introduction elements on respective upper sides and insides are connected to the front sill regions. For example, the funnel-shaped force introduction elements can be welded to the mentioned upper sides and insides of the front sill regions. However, other joining methods are likewise possible. As a result of the funnel-shaped force introduction elements on the upper side and inside being connected to the front sill regions, a particularly good introduction of force, or transmission of force, respectively, from the funnel-shaped force introduction elements to the front sill regions and thus to the inner sills having the undulating cross sections can be ensured.

The motor vehicle according to the invention comprises the body structure according to the invention, or potential design embodiments of the body structure according to the invention.

Further features of the invention can be derived from the claims, the figures and the description of the figures. The features and combinations of features mentioned above in the description, as well as the features and combinations of features mentioned hereunder in the description of the figures and/or shown individually in the figures, can be used not only in the respective combination set forth, but can also be used in other combinations or individually, without departing from the scope of the invention.

Identical and functionally equivalent elements are provided with the same reference signs in the figures.

DETAILED DESCRIPTION OF THE DRAWINGS

Figure 1:
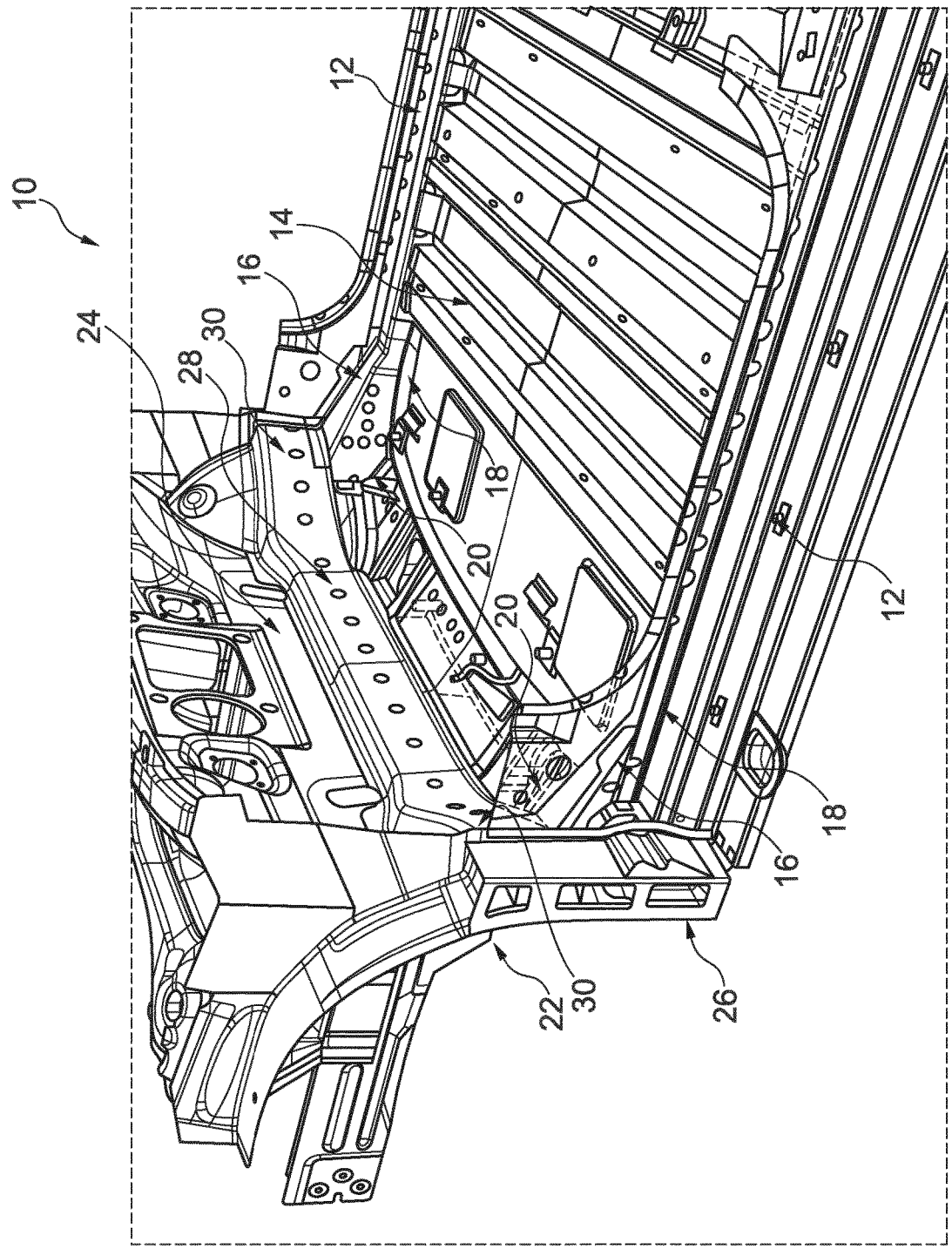
FIG. 1 is a perspective view of a partially illustrated body structure of a motor vehicle, which has two inner sills having a w-shaped cross section.

A body structure 10 for a motor vehicle is partially shown in a perspective view in FIG. 1. The body structure 10 has two inner sills 12 which have in each case a w-shaped cross section. In terms of the vehicle transverse direction, a floor panel 14 is disposed between the inner sills 12. The body structure 10 furthermore comprises two funnel-shaped force introduction elements 16 which, in respective front sill regions 18, are connected to the inner sills 12.

The funnel-shaped force introduction elements 16 widen transversely to the vehicle longitudinal direction, in the case shown here widen in a funnel-shaped manner both in the vehicle transverse direction as well as in the vehicle vertical direction. Respective widened end regions 20 of the funnel-shaped force introduction elements 16 are disposed behind respective front wheelhouse regions 22 and are supported on the rear side on a bulkhead 24 of the body structure 10.

The widened end regions 20 of the funnel-shaped force introduction elements 16 in the vehicle longitudinal direction here are disposed in front of respective A-pillars 26. As a result of the funnel shape of the funnel-shaped force introduction elements 16, the latter can ensure in particular in frontal crash events, even in the case of dissimilar rim sizes or wheel sizes, that corresponding forces can be absorbed and reliably transmitted to the inner sills 12 in the case of most dissimilar wheel impact points. As a result of the w-shaped cross section, the inner sills 12 have correspondingly many edges that run in particular in a straight manner in the vehicle longitudinal direction and provide correspondingly many and stable load paths in the vehicle longitudinal direction.

The body structure 10 furthermore comprises a continuous cross member 28 which, in the vehicle longitudinal direction behind the bulkhead 24, is disposed on the latter. Respective cross member longitudinal ends 30 of the cross member 28 in the vehicle longitudinal direction are disposed behind the front wheelhouse regions 22 and overlap the latter on the rear side. The cross member longitudinal ends 30, like the entire remaining cross member 28, can be welded to the bulkhead 24. Since the cross member 28 runs continuously in the vehicle transverse direction, thus is free of interruptions, the cross member 28 can particularly well stabilize the body structure 10. As can be seen, the cross member 28 is disposed above the funnel-shaped force introduction elements 16, wherein the widened end regions 20 are disposed directly below the cross member 28. The funnel-shaped force introduction elements 16 thus widen in the vehicle vertical direction to the extent that the funnel-shaped force introduction elements 16 in the region of the bulkhead 24 are disposed directly below the cross member 28.

Figure 2:
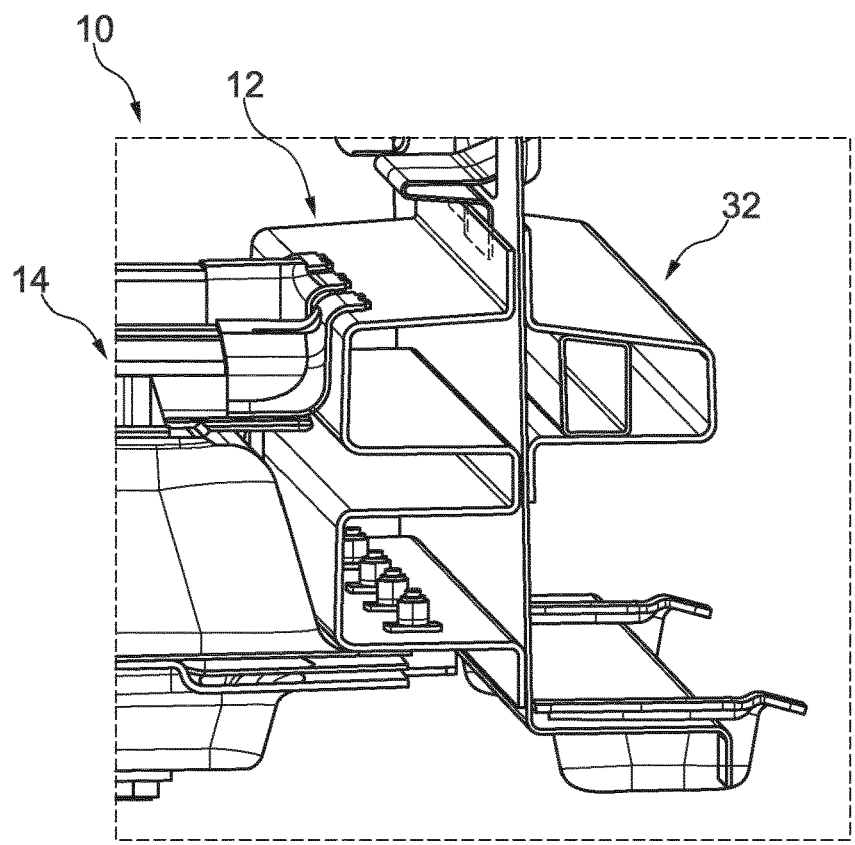
FIG. 2 is a cross-sectional view of part of the body structure, wherein one of the two inner sills having the w-shaped cross section can be seen, an outer sill being disposed on the external side thereof.

A fragment of the body structure 10 is shown in a partially sectional view in FIG. 2. In terms of the forward travel direction of the respective motor vehicle, the left inner sill 12 can be seen here. The already mentioned w-shaped cross-sectional design embodiment of the inner sills 12 can presently be readily seen once again. The body structure 10 moreover has two outer sills 32 which in the vehicle transverse direction are disposed on the external side on the inner sills 12. The inner sills 12 and the outer sills 32 represent correspondingly many longitudinal load paths such that the body structure 10 is very stable above all in frontal crash load events.

Figure 3:
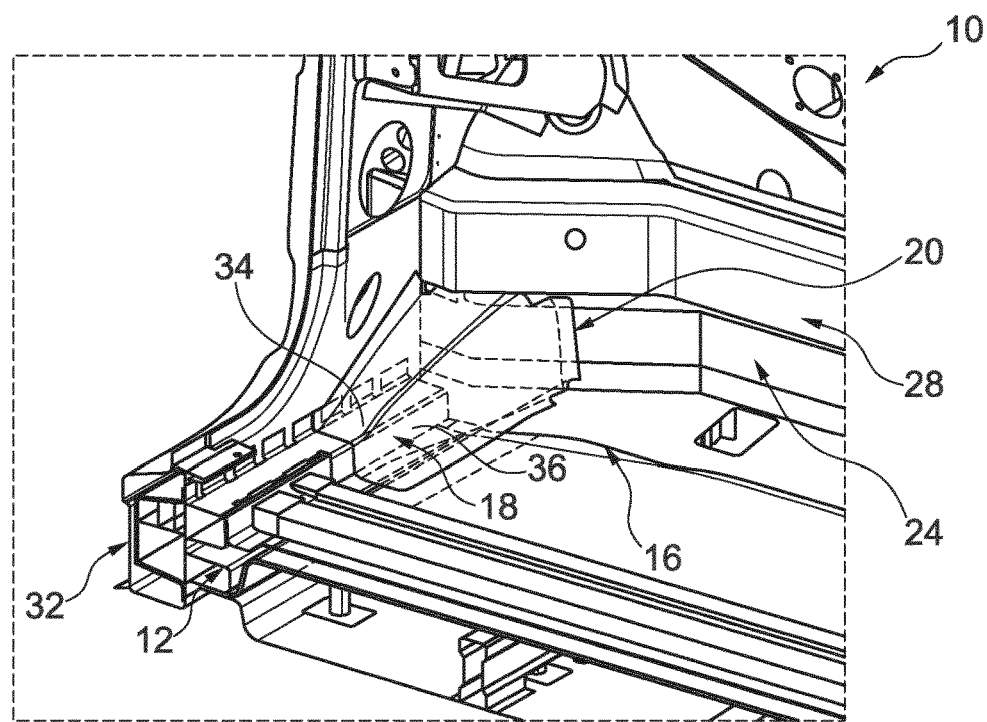
FIG. 3 is a perspective view of part of the body structure, wherein a funnel-shaped force introduction element which is connected to a front sill region of one of the two inner sills having the w-shaped cross section can be seen.

A further fragment of the body structure 10 is partially shown in a perspective view in FIG. 3. According to the present perspective, the view is onto the front sill region 18 of the left inner sill 12. One of the two funnel-shaped force introduction elements 16 and how the latter widens in a funnel-shaped manner toward the front in the vehicle longitudinal direction can presently be readily seen once again. The funnel-shaped force introduction element 16 shown here, on an upper side 34 and on an inside 36, is connected to the front sill region 18 shown here. This can be performed by welding, for example.

It can be readily seen here once again that the cross member 28 is disposed above the funnel-shaped force introduction elements 16, wherein the latter in the vehicle vertical direction widen so far, or so intensely, that the funnel-shaped force introduction elements 16 bear on the cross member 28 directly below the latter. It can be readily seen in this view that the funnel-shaped force introduction elements 16 widen in the vehicle transverse direction as well as in the vehicle vertical direction such that a relatively large region behind the respective front wheelhouse regions 22 can be covered by the widened end regions 20 of the funnel-shaped force introduction elements 16. In particular in the event of a frontal crash, forces that arise can thus be absorbed and transmitted to the inner sills 12 by the funnel-shaped force introduction elements 16, even in the case of most dissimilar rim sizes or wheel sizes.

Figure 4:
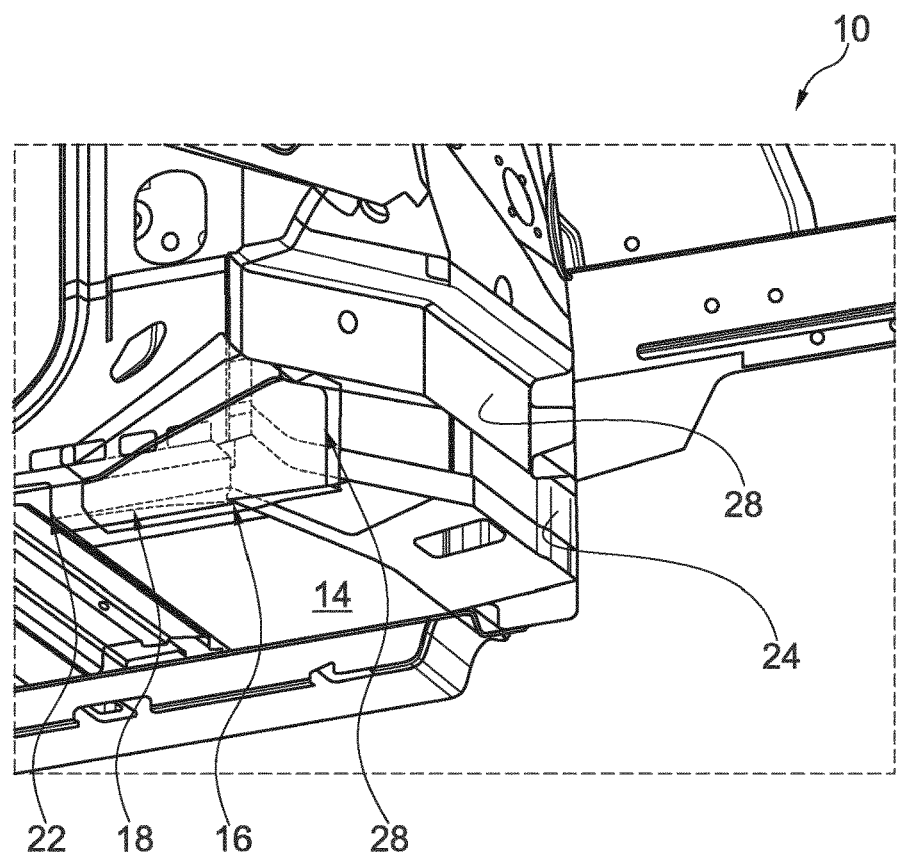
FIG. 4 is a further perspective view of part of the body structure, wherein the funnel-shaped force introduction element which could be previously seen is shown from another perspective.

A similar fragment, or region, of the body structure 10 to that in FIG. 3 is shown in FIG. 4, but from another perspective. The shape of the funnel-shaped force introduction elements 16 can be readily seen once again, which are attached to the respective front sill regions 18 of the inner sills 12 and in the vehicle transverse direction and vehicle vertical direction successively widen up to their widened end regions 20 by way of which the funnel-shaped force introduction elements 16 are supported on the bulkhead 24 of the body structure 10.

Figure 5:
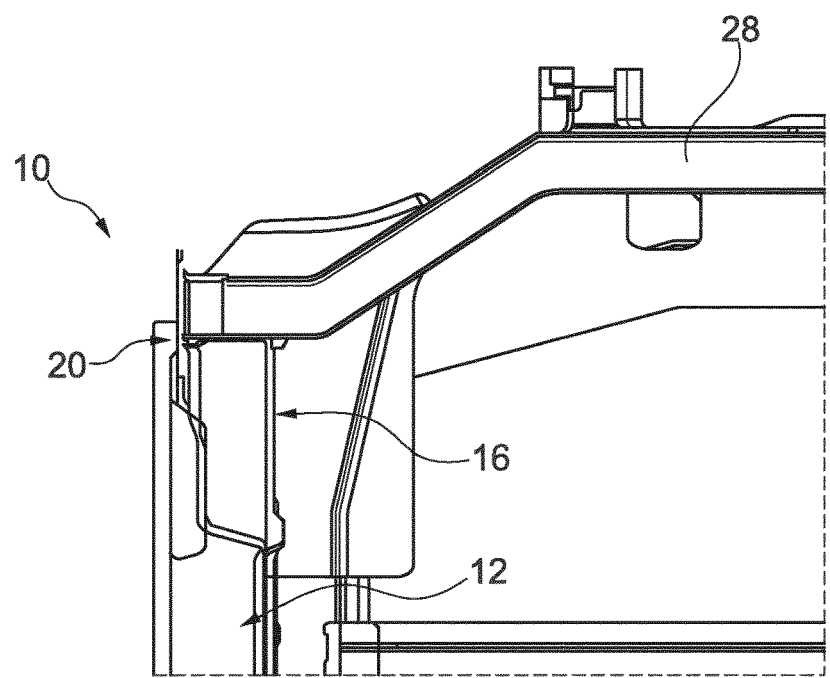
FIG. 5 is a plan view onto part of the body structure, wherein the funnel-shaped force introduction element can inter alia be seen again.

A similar region of the body structure 10 to those in FIGS. 3 and 4 is shown in a plan view in FIG. 5. It can be readily seen once again here that the funnel-shaped force introduction elements 16 are disposed in the front region of the inner sills 12 and extend to below the cross member 28, wherein the funnel-shaped force introduction elements 16 by way of the widened end regions 20 thereof are supported on the bulkhead 24 not referred to in more detail here.

Figure 6:
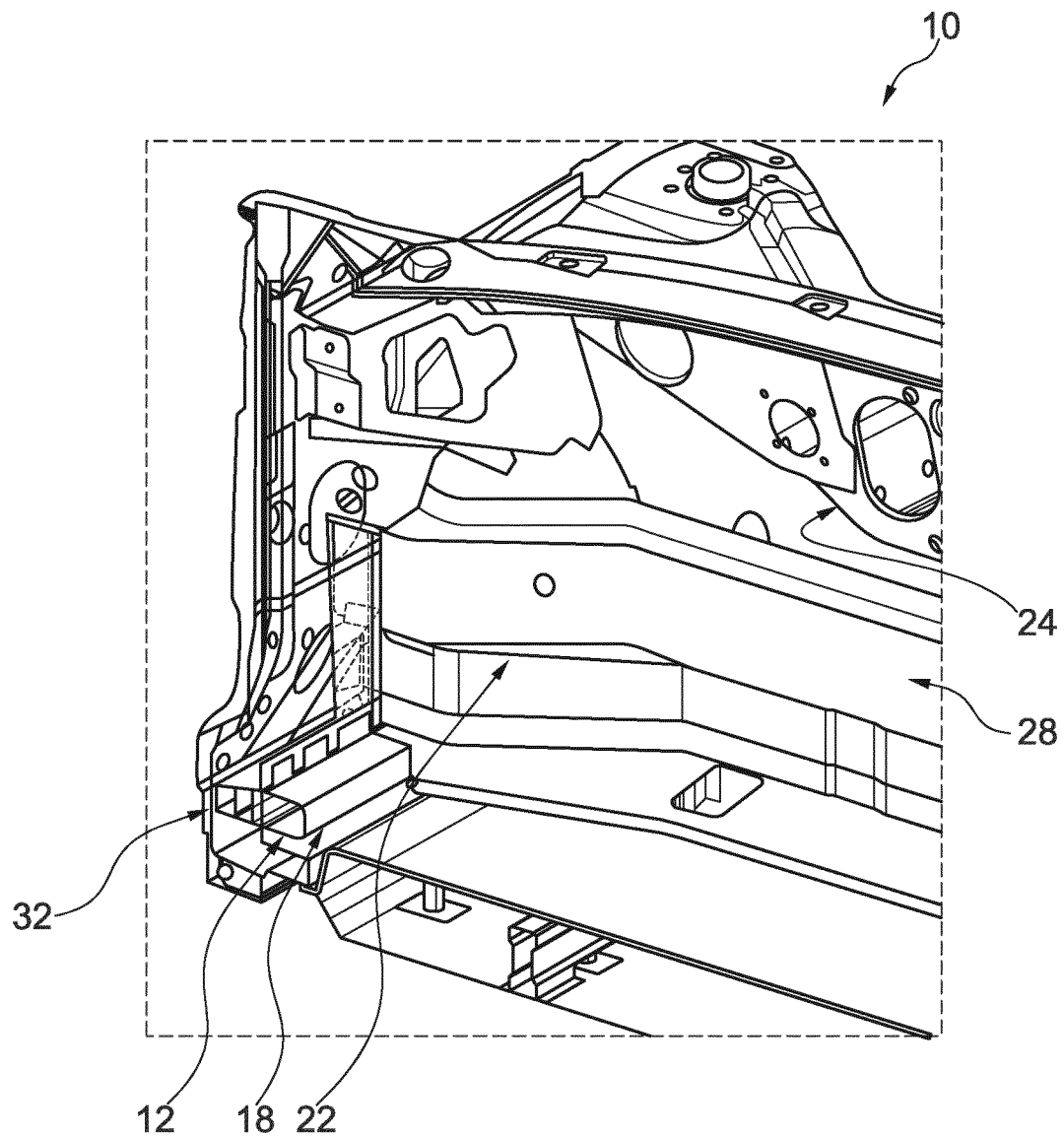
FIG. 6 is a further perspective view of part of the body structure, wherein the funnel-shaped force introduction element is not illustrated.

The body structure 10 is again shown in fragments in a perspective view in FIG. 6, wherein the left inner sill 12 and the left outer sill 32 can inter alia be seen again. The left funnel-shaped force introduction element 16 is not illustrated in the present illustration. It can be seen here that the inner sills 12 in the vehicle longitudinal direction end in front of the bulkhead 24 so as to be somewhat spaced apart from the latter. In this way, there is no direct transmission of force from the bulkhead 24, and in particular from the wheelhouse regions 22, to the inner sills 12, in particular in frontal crash events.

Instead, the funnel-shaped force introduction elements 16, not shown here, by way of the widened end regions 20 thereof absorb corresponding forces and then transmit the latter to the inner sills 12. In the region of respective structure nodes in which the bulkhead 24 is connected to the A-pillar 26 and to the sills 12, 32, the body structure 10 can ensure a particularly high level of stability in particular in frontal crash load events. This is ensured by the inner sills 12 having the w-shaped cross sections thereof, on the one hand, and by the funnel-shaped force introduction elements 16, on the other hand. In this way, regions and components disposed behind the bulkhead 24 can be very well preserved in relation to deformation and thus in relation to damage, in particular in frontal crash load events.

LIST OF REFERENCE SIGNS

10 Body structure
12 Inner sills
14 Floor panel
16 Funnel-shaped force introduction elements
18 Front sill regions of the inner sills
20 Widened end regions of the funnel-shaped force introduction elements
22 Front wheelhouse regions
24 Bulkhead
26 A-pillars
28 Cross member
30 Cross member longitudinal ends
32 Outer sills
34 Upper sides of the front sill regions
36 Insides of the front sill regions

The invention claimed is:

1. A body structure for a motor vehicle, comprising:
two inner sills having an undulating cross section;
a floor panel arranged in a transverse direction of the vehicle between the two inner sills;

two funnel-shaped force introduction elements which are connected in respective front sill regions to the two inner sills and widen in a funnel-shaped manner and, behind respective front wheelhouse regions, are supported by their respective widened end region on a rear side of a bulkhead of the body structure, wherein the funnel-shaped force introduction elements widen in a transverse and vertical direction with respect to a longitudinal direction of the vehicle.

2. The body structure according to claim 1, wherein the undulating cross section of the two inner sills is channel-shaped.

3. The body structure according to claim 1, further comprising:

two outer sills, each of which, in the transverse direction, is disposed on an external side on a respective inner sill.

4. The body structure according to claim 1, further comprising:

a continuous cross member which, behind the bulkhead in a longitudinal direction, is disposed on the bulkhead.

5. The body structure according to claim 4, wherein respective cross member longitudinal ends of the continuous cross member are disposed behind the front wheelhouse regions in the longitudinal direction of the vehicle, and said respective cross member longitudinal ends are welded so as to overlap on the bulkhead.

6. The body structure according to claim 4, wherein the cross member is disposed above the funnel-shaped force introduction elements.

7. The body structure according to claim 4, wherein the cross member is disposed in front of respective A-pillars in the vehicle longitudinal direction.

8. The body structure according to claim 1, wherein the funnel-shaped force introduction elements are connected to the front sill regions on respective upper sides and insides.

9. A motor vehicle comprising a body structure according to claim 1.

\* \* \* \* \*